C. LINDSEY AND E. C. WADDINGTON.
COMBINED CUTTER AND SCRAPER.
APPLICATION FILED JUNE 30, 1920.

1,365,927.

Patented Jan. 18, 1921.
3 SHEETS—SHEET 2.

C. LINDSEY AND E. C. WADDINGTON.
COMBINED CUTTER AND SCRAPER.
APPLICATION FILED JUNE 30, 1920.

1,365,927.

Patented Jan. 18, 1921.
3 SHEETS—SHEET 3.

INVENTORS.
Clinton Lindsey and
Edward C. Waddington.
BY William J. Graham
ATTORNEY.

UNITED STATES PATENT OFFICE.

CLINTON LINDSEY, OF SALEM, AND EDWARD C. WADDINGTON, OF WOODSTOWN, NEW JERSEY.

COMBINED CUTTER AND SCRAPER.

1,365,927.  Specification of Letters Patent.  Patented Jan. 18, 1921.

Application filed June 30, 1920. Serial No. 393,166.

*To all whom it may concern:*

Be it known that we, CLINTON LINDSEY, of Salem, county of Salem, and State of New Jersey, and EDWARD C. WADDINGTON, of Woodstown, county of Salem, and State of New Jersey, respectively, have jointly invented certain new and useful Improvements in Combined Cutters and Scrapers, of which the following is a specification.

It is an object of the present invention to provide a machine of this character in which flesh and fat are scraped free of hide and separated therefrom simultaneously with the cutting of strips of hog and similar meat into small particles for domestic purposes. It is a further object of the present invention to provide a simple, practical, efficient, compact and thoroughly reliable machine of this character which may be manufactured and sold at comparatively low cost. Other and further objects reside in the provision of such detailed construction, arrangement and combination of parts as tend to raise the usefulness, commercially considered of the present machine over like apparatus now upon the market.

The invention consists of the improvements hereinafter described and finally claimed.

The nature, characteristic features and scope of the invention will be more fully understood from the following description taken in connection with the accompanying drawings forming part hereof, and in which:—

Fig. 5, is a similar view of another detail of construction.

Figure 1:
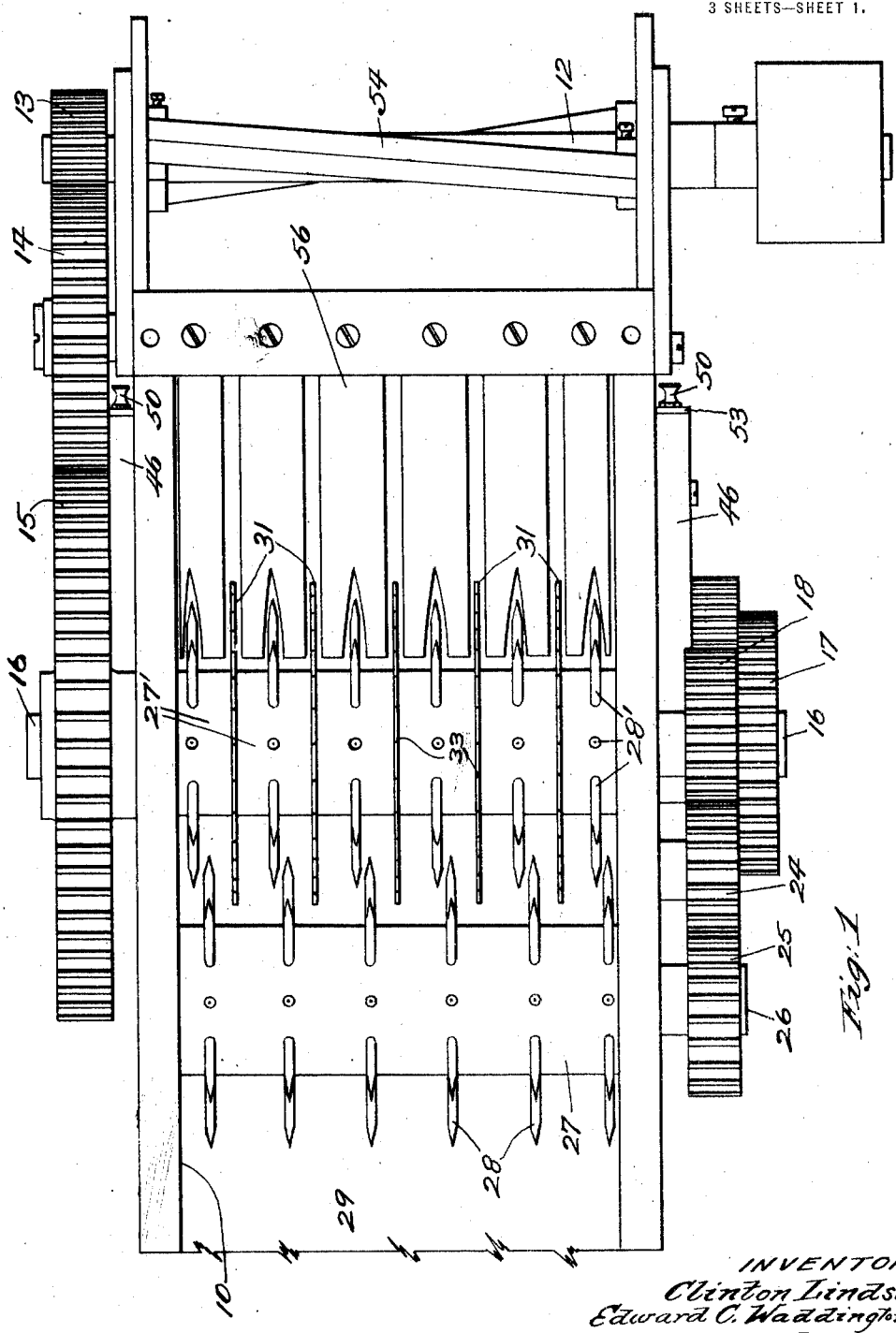
Figure 1, is a top or plan view of a machine, embodying features of the invention, the machine cover being removed.

For the purpose of illustrating our invention we have shown in the accompanying drawings one form thereof which is at present preferred by us, since the same has been found in practice to give satisfactory and reliable results, although it is to be understood that the various instrumentalities of which our invention consists can be variously arranged and organized and that our invention is not limited to the precise arrangement and organization of the instrumentalities as herein shown and described.

In the drawings 10, designates a trough-like structure supported upon legs 11. Rotatably supported at one end of the structure 10 is a laterally disposed main driving shaft 12, which may be hand or power driven. Such shaft 12 is provided with a pinion 13, which meshes with an intermediate gear-wheel 14 which in turn meshes with a gear-wheel 15 fixed to a laterally disposed shaft 16 journaled in the side walls of the structure 10. The shaft 16 has fixed thereto a gear-wheel 17 and a spur-gear 18. The gear-wheel 17 is in mesh with a gear-wheel 19 fixed to a shaft 20 journaled in the frame 10 parallel to and in a plane below shaft 16. Fixed to shaft 20 is a spur gear 21 which is in mesh with a spur gear 22 fixed to a shaft 23 also mounted in frame 10 and paralleling and in the same plane with shaft 20. Spur-gear 18 upon shaft 16 is in mesh with an idler 24 which in turn is in mesh with a gear-wheel 25 fixed to shaft 26 which parallels and is in the same plane with shaft 16. By such arrangement of gearing, shafts 12, 16, 23 and 26 are capable of rotation in the same direction and shaft 20 in the opposite direction. A description will now be given of the various parts carried by and associated with said shafts and the function thereof.

Figure 2:
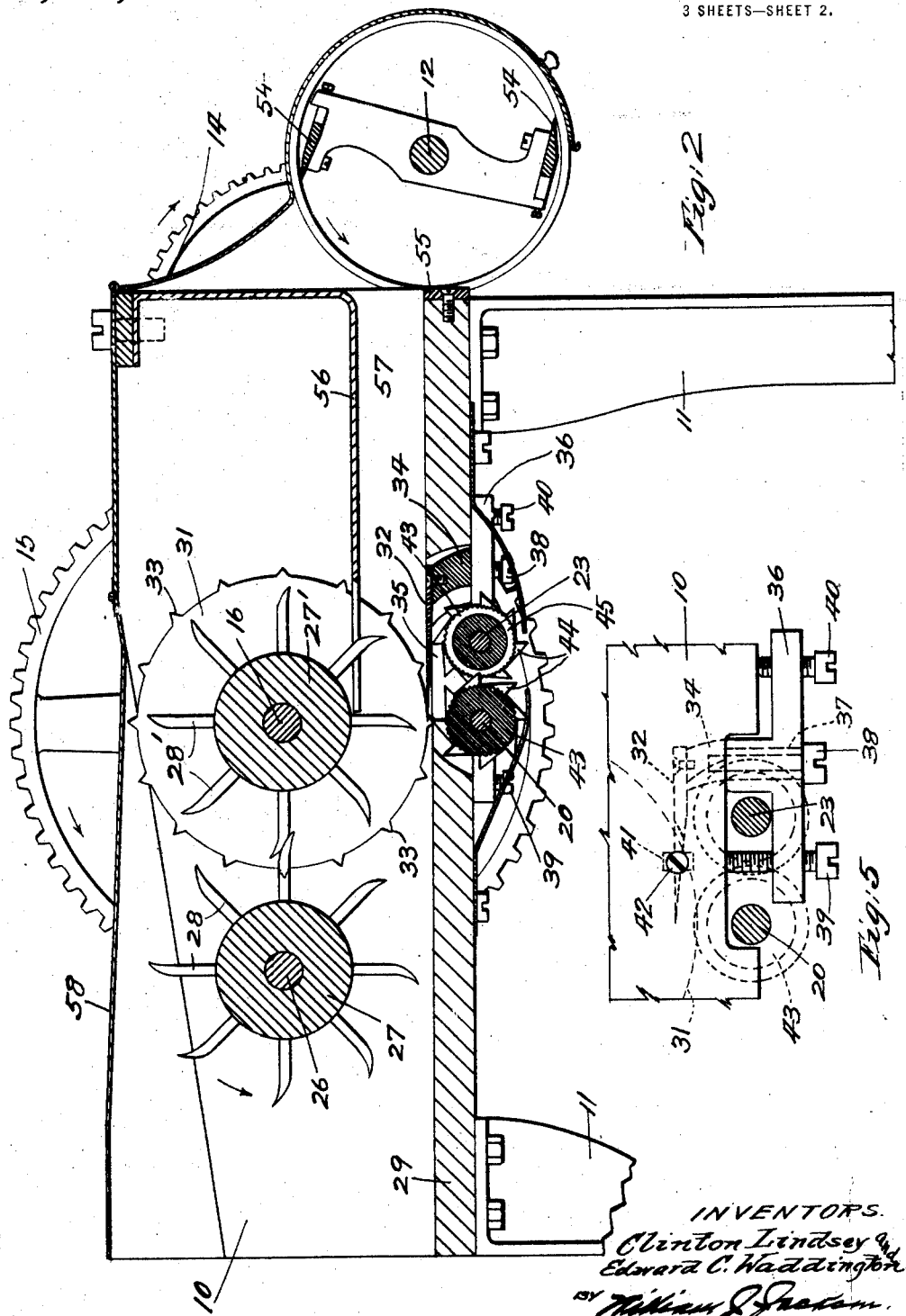
Fig. 2, is a view in longitudinal section.

*Primary feed.*—Mounted upon shaft 26 is a cylinder 27 provided with a plurality of radially disposed pins 28 having pointed ends. These ends are slightly curved as shown in Fig. 2, so that in feeding meat along the floor 29 of structure 10 the pointed ends may readily withdraw from the meat at the proper period of time. If the pins were not curved but straight the tendency of the pins would be that of drawing the meat up and around the cylinder to cause jamming of machine parts.

*Secondary feed.*—Mounted upon shaft 16 are a plurality of removable collars 27' each provided with a series of radially disposed pins 28' similar in all respects to pins 28. The pins 28' are so spaced as to clear the pins 28 in revolution, the two sets of pins overlapping as clearly shown in Fig. 2. The object of the closely adjacent feeds is to draw meat, including flesh, fat and hide in a horizontal position along the floor 29 directly to the cutting disks 31 and scraper knife 32.

*Cutting-disks.*—The cutting-disks 31 are mounted upon shaft 16 between adjacent collars 29 and are removable. These disks each, have a serrated or toothed cutting edge designated 33. These disks serve to cut the flesh, fat and hide into strips and the toothed portions of the disks function as additional mediums for drawing the material to be cut in a direction toward the scraper knife 32.

*Scraper-knife.*—The scraper-knife 32 is fixed to a bar 34 which extends transversely across the structure 10 within an opening 35 in the floor 29. Beneath each side wall of structure 10 is positioned in a tiltable manner a longitudinally disposed member 36 by which the bar 34 and scraper-knife 32 are carried. The members 36 are each vertically slotted as at 37, see Fig. 5, and a screw 38 passes therethrough and engages with bar 34. At each end of each member 36 are other screws 39 and 40 which abut against the underside of a side-wall of structure 10. By loosening screw 38 and properly adjusting screws 39 and 40 the scraper-knife may be tilted to sever thin or thick hide from flesh and fat. In order to maintain the scraper-knife rigidly in adjusted position clamps 41, operated by screws 42 passing through the side-walls of structure 10, are provided. Such clamps engage with the vertical side edges of the scraper-knife adjacent its cutting edge.

Figure 3:
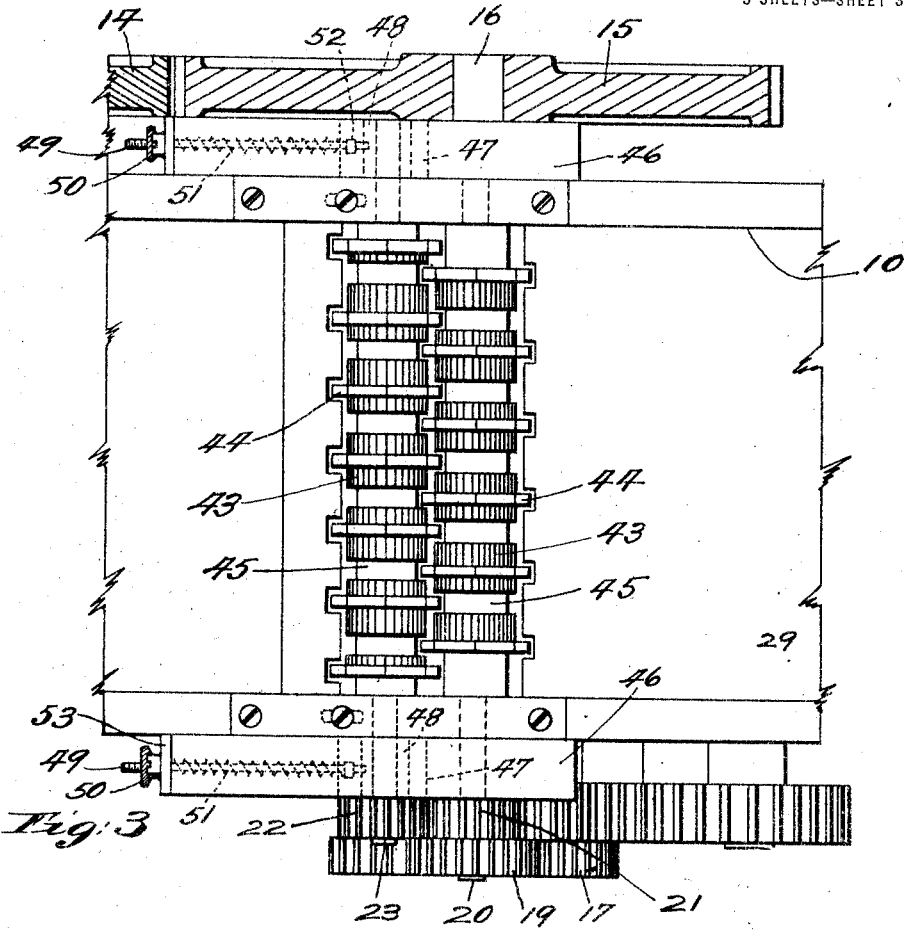
Fig. 3, is a fragmentary view of the machine as viewed from the under side thereof.
Figure 4:
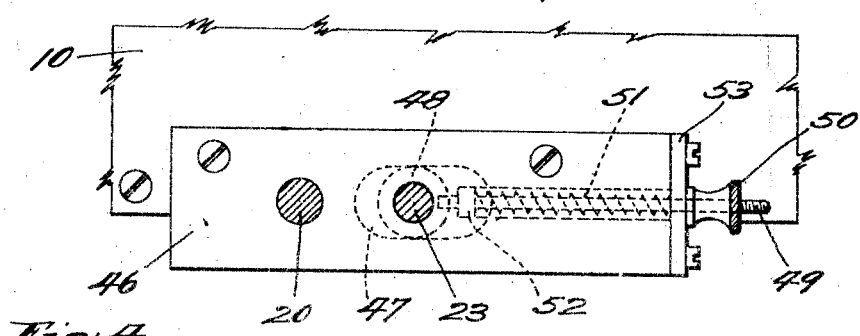
Fig. 4, is a similar view, in elevation, illustrating a detail of construction.

*Scraper-knife rolls.*—Immediately beneath the scraper-knife are rolls mounted upon shafts 20 and 23. Each roll comprises a plurality of serrated collars 43 having between adjacent collars toothed disks 44. The teeth of disks 44 while spaced apart overlap and to permit proper rotation the serrated collars are annularly grooved at 45 see Fig. 3, to permit said teeth to function. As the hide is scraped from the flesh and fat it is caught by the teeth of disks 44, which rotate in opposite directions, and is drawn down between the rolls. The serrated collars assist in the drawing process. It has been found in practice that one roll is not practical for such operation. In practice the shaft 23 is mounted in a yielding manner so that it responds to different thicknesses of hide. Fixed to the side walls of structure 10 are journal-boxes 46 slotted as at 47, see Fig. 4. Mounted within each slot 47 is a collar 48 in which shaft 23 is rotatable. Fixed to each collar is a stem 49 the screw-thread end of which projects from the journal box and is provided with a nut 50 for adjusting the tension of spring 51. The spring is interposed between a collar 52 fixed to stem 49 and the cover plate 53 of the journal-box.

*Mincing-knives.*—As the hide is severed from the flesh and fat the latter are caused to pass to the mincing-knives 54. These are secured to shaft 12 and are adapted to cut the strips of flesh and fat into small rectangular particles. The mincing-knives cooperate with a ledger-bar 55 for effecting a cut of this kind. Between the cutting-disks 31 and the mincing-knives is positioned an L-shaped guide 56. Such guide partially closes the ends of structure 10 adjacent the mincing-knives but leaves a channel or passage-way 57 for the travel of the meat strips in a horizontal manner along the floor of structure 10.

A cover 58 is provided for the machine and it will be understood that the scraper-knife, floor 29, bar 34 and guide 56 are properly slotted to permit functioning of parts. A description of the operation of the machine it is thought will be readily understood without resort to further description.

It will now be apparent that we have devised a novel and useful construction which embodies the features of advantage enumerated as desirable in the statement of the invention and the above description and while we have in the present instance shown and described the preferred embodiment thereof which has been found in practice to give satisfactory and reliable results, it is to be understood that the same is susceptible of modification in various particulars without departing from the spirit or scope of the invention or sacrificing any of its advantages.

What we claim is:—

1. A machine of the character stated comprising a trough-like structure arranged to receive the fleshy and fatty parts of meat with the hide attached, primary feeding means rotatably mounted in said structure, secondary feeding means also rotatably mounted in said structure, slicing means carried by the secondary feeding means said slicing means being adapted to cut said meat and hide into strips, means located in the floor of said structure and beneath said secondary feeding means for severing the hide from the meat, oppositely disposed rotatable rolls beneath said severing means for drawing the hide away therefrom and means for cutting the fleshy and fatty parts of the meat into rectangular particles.

2. A construction as described in claim 1, characterized by means for tilting the hide severing means into position for effecting thinner or thicker cuts.

3. A construction as described in claim 1, characterized by means for permitting one of the rolls beneath the severing means to yield in a direction toward or away from the other roll in order to accommodate hide of varying thickness.

4. A machine of the character stated comprising a trough-like structure arranged to receive the fleshy and fatty parts of meat with the hide attached, primary feeding means rotatably mounted in said structure, secondary feeding means also rotatably mounted in said structure, slicing means carried by the secondary feeding means said slicing means being adapted to cut said meat and hide into strips, means located in the floor of said structure and beneath said secondary feeding means for severing the hide from the meat, means for tilting said severing means into position for effecting thinner or thicker cuts, means for interlocking that part of the severing means adjacent its cutting edge with respect to the side walls of said trough-like structure, oppositely disposed rotatable rolls beneath said severing means for drawing the hide away therefrom and means for cutting the fleshy and fatty parts of the meat into rectangular particles.

5. A construction as described in claim 1, characterized by said primary and secondary feeding means being provided with pointed pins the free ends of which are rearwardly bent to permit ready disengagement from meat as fed thereby.

6. A construction as described in claim 1, characterized by said cutting-disks having a serrated or toothed cutting edge.

7. A machine of the character stated comprising a trough-like structure arranged to receive the fleshy and fatty parts of meat with the hide attached, primary feeding means rotatably mounted in said structure, secondary feeding means also rotatably mounted in said structure, said primary and secondary feeding means being provided with pointed pins the free ends of which are rearwardly bent to permit ready disengagement from meat as fed thereby the radius of the combined feeding means being less than the distance between centers of said feeding means whereby said pins interfit, slicing means carried by the secondary feeding means said slicing means being adapted to cut said meat and hide into strips, means located in the floor of said structure and beneath said secondary feeding means for severing the hide from the meat, oppositely disposed rotatable rolls beneath said severing means for drawing the hide away therefrom and means for cutting the fleshy and fatty parts of the meat into rectangular particles.

In testimony whereof we have hereunto signed our names.

CLINTON LINDSEY.
EDWARD C. WADDINGTON.